United States Patent [19]

Brown

[11] 3,809,813

[45] May 7, 1974

[54] TELEPHONE ALARM SIGNALLING SYSTEM

[76] Inventor: Preston R. Brown, Box 319, Quogue, N.Y. 11959

[22] Filed: Dec. 14, 1972

[21] Appl. No.: 314,961

Related U.S. Application Data

[62] Division of Ser. No. 87,267, Nov. 5, 1970, abandoned.

[52] U.S. Cl. .................... 179/5 R, 179/5 P

[51] Int. Cl. .................... H04q 9/00

[58] Field of Search .................... 179/5 R, 5 P

[56] References Cited

UNITED STATES PATENTS

| | | | |
|---|---|---|---|
| 2,555,714 | 6/1951 | Talbot | 179/5 P |
| 2,594,726 | 4/1952 | Burgener | 179/18 HB |
| 2,783,302 | 2/1957 | Kropp | 179/5 P |

*Primary Examiner*—Harold I. Pitts

*Attorney, Agent, or Firm*—Cooper, Dunham, Clark, Griffin & Moran

[57] ABSTRACT

A system for indicating an abnormal condition at premises provided with a telephone subscriber station having a telephone callable from an outside station. The system includes a series connection of (1) a normally open control switch, and (2) a sensor switch which is open when the abnormal condition is not present, but which is closed in response to the presence of an abnormal condition, such as a fire at the premises. The control switch cooperates with the telephone ringer and is closed thereby either intermittently or continuously when the telephone set is ringing. The series connection of the sensor switch and the control switch is connected across the telephone line of the subscriber station to intermittently interrupt the ring back signal heard at the calling station when both switches are closed, without interfering with the ring back signal heard at the calling station when either switch is open. Thus, when the abnormal condition is not present at the premises, and the subscriber station is called, the calling station receives a normal uninterrupted ring back signal, because the sensor switch is open. However, when the abnormal condition is present at the premises, both the control switch and the sensor switch are closed when the ringer at the subscriber station is ringing, and the ring back signal heard at the calling station is interrupted. The interruption may be continuous, as though the receiver of a telephone set at the subscriber station has been picked up.

20 Claims, 2 Drawing Figures

INVENTOR.

TELEPHONE ALARM SIGNALLING SYSTEM

This is a continuation, of application Ser. No. 87,267 filed 11/5/70, now abandoned.

The invention relates to systems for warning of abnormal conditions at the premises of telephone subscribers when such conditions are unattended.

Few telephone alarm systems have been primarily devised to warn of hazards that do not require fast response for effective prevention and of these the most common ones simulate an 'off-hook' phone during emergencies, to signify a warning by a persistent 'busy' signal to interrogating calls. This warning technique is objectionable on several counts, which considerably diminishes the systems' usefulness in practice. First, telephone central office switching equipment may be tied up for hours or even days with possible adverse effect upon public service during peak traffic periods. Second, if the locality served by a central office were to be saturated with such systems, a massive power failure of sufficient duration could also disrupt public service if the collective preventive action of individual protected subscribers were not enough to avoid it. Third, if a central office tie-up resulted in a visit to the premises by a telephone repairman, this could result in line disconnection and thus interrogating calls would not hear a 'busy' signal and, if not warned otherwise by disconnect notice from the telephone company, the system could fail. Fourth, use of the technique is limited to private as opposed to party line subscribers which is an important restriction to potential public benefit as, for example, is the case when rural areas that most urgently need protection against energy system failures, can not get it because private line service is generally unavailable. Fifth, because of the first three objections, the tariff aspect of the present technique is clouded and accordingly, this encourages a negative attitude upon the part of many telephone companies as well as obstructive tactics on the part of a few thereby discouraging or preventing private line subscribers from use of the system. Sixth, the morality of toll-free calls wherein information is received is questionable.

SUMMARY OF THE INVENTION

The principal objective of this invention is to provide telephone subscribers of all kinds with an alarm system that is inexpensive yet reliable and which overcomes most, if not all of the above enumerated objections to present systems in use.

The invention is generally comprised of an alarm circuit that includes a normally open sensor switch in series with a normally open control switch connected across a subscriber's telephone line. The sensor switch is arranged to be closed and to be held closed by appropriate sensing means during abnormal conditions and the control switch is positioned to be caused to close and then to be allowed to open periodically by the electromagnetic action of the 'ringer' of said telephone when it is energized by a ringing voltage. Thus the alarm circuit across the telephone line is periodically connected through the closed sensor switch during emergencies by ringer actuation of the control switch thereby causing an interrogatory caller to hear interrupted ringing to signify an emergency. If the period of control switch closure is short, ringing will be interrupted continuously; if it is long, said telephone 'answers' automatically, whereby the ring back signal is followed by silence, as though someone had picked up the receiver of a ringing telephone. In either case, the audibly interrupted ringing, regardless of the character of said switch interruption, is a sufficient departure from what is normal under the circumstances to signify an emergency or abnormal condition to someone making an interrogatory call.

In a common application of the invention, for example, a 'thermostat' is closed and held closed by the action of abnormal temperatures upon a bimetal or other appropriate temperature sensing means and a 'snap-acting' control switch is closed momentarily by the periodic striking of the bell-hammer upon the plunger-lever of said switch thereby continuously interrupting the ringing to interrogatory callers during emergency.

Although the 'sensor switch' in the example has been described as being a bimetal thermostat, obviously any physical, optical or chemical means will do as well to actuate a switch provided only that such sensing means be appropriate to the condition to be warned against, in this case temperature, these means being well known. Similarly any "control switch" that automatically returns to its normal, open state, regardless of its means for doing so, will serve as well as a 'snap-acting' switch for the purpose of this invention. Also it is obvious and to be understood herein and with particular reference to the drawing below, that any electromagnetic device, like the "ringer," that can be energized by the ringing voltage when a subscriber's telephone is called, can be used to actuate the control switch instead of the ringer to interrupt the ringing.

DETAILED DESCRIPTION

Figure 1:
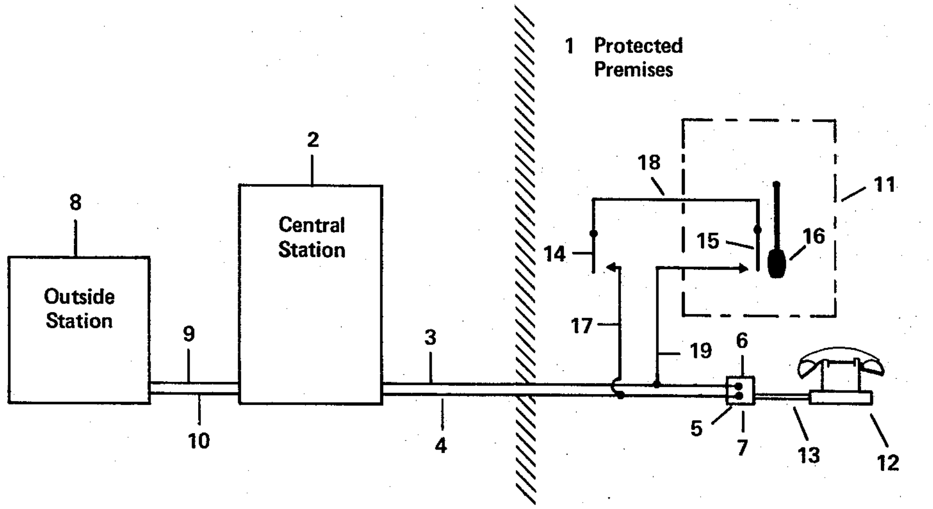
Figure 2:
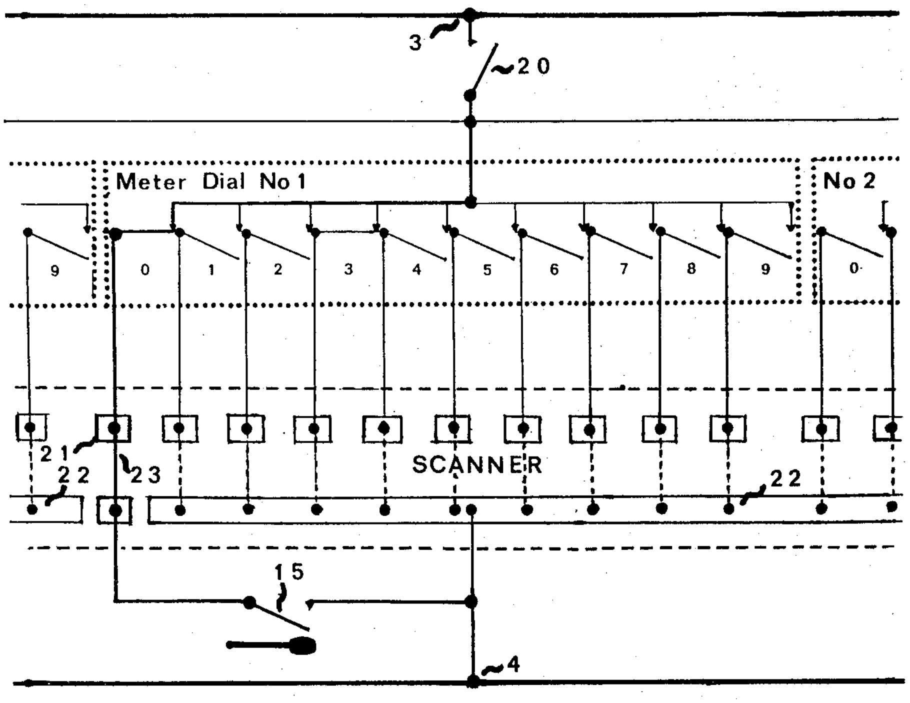

With reference to the accompanying drawing:

The single FIGURE illustrates the system ready for use. The features to the right of the cross-hatched line, which will generally be referred to by the numeral 1, are to be regarded as being installed in the protected premises, also to be known herein as the "subscriber's station." Said premises may comprise a business, factory, dwelling or the like. Within the premises, the features enclosed by the dotted line, which will generally be referred to by the numeral 11, are to be regarded as comprising the ringer of the telephone in a preferred embodiment of the invention, but with with it should be understood that only the most significant parts respecting the specification are depicted and that, in a general sense, any like-functioning electromagnetic means energized by the ringing voltage may be used.

The alarm system is intended to operate in combination with the public telephone system, including direct distance dialling apparatus. The central station 2 of said system is connected with the subscriber's station by line wires 3 and 4, which terminate in a switchbox 5 at contacts 6 and 7 respectively. Other subscriber stations are treated collectively as "Outside Station" 8. Outside stations are also connected to said central station by wires or other connecting means 9 and 10. A subscriber of his agent may call or dial the subscriber's station from any outside station by any suitable means, manual or automatic as by computer means, so as to be satisfied as to conditions at the subscriber's station.

Within the subscriber's station 1, telephone line wires 13 connect switchbox 5 to the subscriber's telephone 12. The alarm circuit 17, 14, 18, 15, 19, comprises a normally open sensor switch 14, a normally open control switch 15, and wire leads 17, 18 and 19 that connect said switches in series with one another across line wires 3, 4. The ringer 11 or like device includes a bell-hammer 16 in a preferred embodiment.

In normal telephone operation, a call to an unattended subscriber's station from any outside station results in either continuous ringing or a 'busy' signal, depending upon whether or not circuits are available or another call is in progress to the subscriber's station at the same time. Because a 'busy' condition is a rare event, usually of short duration, normally continuous or 'uninterrupted' ringing occurs when an unattended telephone is called from an outside station. It is obvious from the foregoing that if the protected subscriber's station is called from an outside calling station during abnormal conditions at said protected premises, a signal would be actuated thereby that could be perceived as different in character from the normal uninterrupted ringing by calling stations. When a subscriber or his agent are presumed to know that the protected station is unattended and make periodic calls to that unattended station, abnormal conditions detected by the invented system result in audibly interrupted ringing which is different from the normal continuous ring back signal as to constitute a warning such abnormal conditions at the subscriber's station, in time to take preventive action.

Attention is directed to the FIGURE which shows one means of automatically actuating a signal at central station 2 and outside subscriber stations 8 from the subscriber's station 1 and thus causing interrogatory calls to result in an audibly interrupted ringing signal so long as abnormal conditions exist at the protected premises. This is accomplished by the alarm circuit 17, 14, 18, 15, 19, that comprises a normally open sensor switch 14 in series with a normally open control switch 15, actuated by a ringer 11 or like device, connected by wire leads 17, 18 and 19 that connect said switches 14 and 15 in series with one another across line wires 3 and 4. The ringer 11 in the preferred embodiment includes a bell-hammer 16 in position to actuate control switch 15. Thus when ambient conditions within the protected premises vary from normal to some extent considered abnormal and established by the predetermined set point of sensor switch 14, switch 14 is thereby caused to close and to be held closed by sensing means appropriate to the monitored condition; at this point control switch 15 is in its normally open state. Interrogatory calls from any outside station 8 to the subscriber's telephone 12 will energize ringer 11 thereby causing bell-hammer 16 to vibrate and in so doing to periodically strike the plunger-lever or similar actuating means of control switch 15. With sensor switch 14 held closed during abnormal conditions, periodic closure of control switch 15 also closes the alarm circuit across the telephone line 3, 4 and thereby makes periodic connection to central station 2 and to any outside station 8 calling protected station 1. To an interrogatory call the periodic connection between stations 1 and 8 causes audibly interrupted ringing. If interrogatory calls are made with reasonable frequency with respect to the hazard being monitored, such a signal will serve as effective warning for timely preventive action. For so long as conditions remain abnormal, interrogatory calls will continue to hear interrupted ringing. When normal conditions return, sensor switch 14 will be caused thereby to open the alarm circuit and thus to automatically restore subscriber's telephone 12 to normal operation. Interrogatory calls from outside station 8 will then hear a normal, uninterrupted ringing that signals a satisfactory condition within the premises 1 with respect the the hazard being monitored.

With reference to the objections which were enumerated above respecting similar telephone alarm signalling systems now in use, two improvements of this invention will be apparent. First, central office switching equipment tie-up is completely avoided under all practical conditions because central station connection to the protected subscriber's station only exists during calls to said station, and then an interrupted ring back signal results only during abnormal conditions. Thus, the objectionable features one through five discussed earlier are overcome. Second, any calls to said protected sttion during abnormal conditions, interrogatory or otherwise, could be answered automatically with resultant toll charges. This can be accomplished if the period of closure of control switch 15 is caused to be long enough to simulate a subscriber's 'answer' to a call by pick-up of the receiver. In this way objectionable feature six discussed above can be overcome at the discretion of the subscriber.

What I claim is:

1. A system for detecting the presence of an abnormal condition at the premises of a telephone subscriber station which is connectable to an outside calling station by a telephone line to provide over said line, in response to a call from the outside station, a ringing signal at the subscriber station and a ring back signal at the calling station, said system serving to modulate said ring back signal when the abnormal condition is present at the subscriber station premises without interfering with the ring back signal when the abnormal condition is not present at the premises, and comprising:

a series connection of a sensor switch and a normally open control switch and means connecting said series connection of the sensor and control switches across the telephone line for modulating a ring back signal over the line provided in response to a call from the outside station when both switches are closed without interfering with the ring back signal when either switch is open, a sensor located at the premises of the subscriber station and including means for closing the snesor switch when said abnormal condition is present at the subscriber station premises and for opening the sensor switch when the abnormal condition is not present at the premises, said normally open control switch including means for closing the control switch at least intermittently in response to a ringing signal provided at said subscriber station in response to a call from said outside station, whereby both switches are closed at least intermittently when the abnormal condition is present at the subscriber station premises and the subscriber station is provided with a ringing signal in response to a call from the outside station, and said ring back signal is thereby modulated to indicate to the outside calling station that the abnormal condition is present at the premises of the subscriber station, but the control switch is open when the subscriber station is not provided with a ringing signal, whereby the subscriber station is freed at the termination of said call from the outside station.

2. A system as in claim 1 wherein the subscriber station includes a receiver equipped telephone set, and wherein the means for closing the control switch comprise means for closing the control switch for a period of time sufficient to simulate picking up the receiver of the subscriber station telephone set.

3. A system as in claim 1 wherein the subscriber station includes a telephone ringer with a hammer vibrating when the subscriber station is provided with a ringing signal and wherein the means for closing the control switch comprise means responsive to the vibration of the hammer for closing the control switch for at least portions of the period during which the hammer is vibrating.

4. A system as in claim 1 wherein the means for closing the control switch in response to a ringing signal comprise means for closing the control switch intermittently for periods whose duration is insufficient to simulate a completed call from the outside station to the subscriber station, whereby the outside station receives an intermittently interrupted ringing signal until the connection thereof to the subscriber station is selectively terminated.

5. A system as in claim 4 wherein the subscriber station includes a telephone ringer with a hammer vibrating when the subscriber station is provided with a ringing signal and wherein the means for intermittently closing the control switch comprise means for closing the control switch in response to selected portions of the vibration of the hammer.

6. A system for indicating an abnormal condition at premises provided with a telephone subscriber station having a telephone ringer callable from an outside station to establish a ringing connection between the outside station and the subscriber station over a telephone line, comprising:

sensor switch means having a first and a second state, said means located at the premises and responsive to the presence of said abnormal condition at the premises to maintain its first state for as long as the abnormal condition is present and responsive to the absence of the abnormal condition at the premises to maintain its second state for as long as the abnormal condition is absent at the premises;

control switch means having a first and a second state and responsive to a ringer call from said outside station establishing a ringing connection over a telephone line between the subscriber station and the outside station to maintain its first state at least intermittently while said ringing connection between the subscriber and the outside stations is present and to maintain in its second state at all other times;

means for connecting the sensor switch means and the control switch means to each other and to the telephone line and for interrupting at least intermittently the ringing connection over the line between the subscriber and the outside stations only when both switch means are in their first states, to thereby modulate a ringing connection ring back signal at said outside station only when the abnormal condition is present at the premises and only while the telephone ringer at the subscriber station is ringing or about to ring in response to a call thereto from the outside station, whereby the termination of said call frees the subscriber station for a subsequent call, and whereby no modulation is caused when no abnormal condition is present at the premises.

7. A system as in claim 6 wherein the modulated of the ringing signal at the outside station is an intermittent interruption comprising a series of periods of interruption and of lack of interruption, said periods of interruption being of insufficient duration to complete the call from the outside station to the subscriber station.

8. A system as in claim 6 wherein the modulation of the ringing connection is sufficient to complete the call from the outside station to the subscriber station, to thereby simulate picking up the receiver of a telephone set at the subscriber station.

9. A system as in claim 6 wherein the subscriber station includes a telephone ringer ringing in response to a call from the outside station and having a hammer vibrating when the subscriber station is provided with a ringing signal, and wherein the control switch means includes means for maintaining the first state of the control switch means at least intermittently in response to vibration of said hammer.

10. A system for detecting the presence of an abnormal condition at a telephone subscriber station connectable to an outside calling station by a telephone line to provide a ringing signal over said line in response to a call from the outside station, comprising means for modulating said ringing signal when the abnormal condition is present at the subscriber station without interfering with the ringing signal when the abnormal condition is not present, including: a series connection of a sensor switch and a normally open control switch connected across the telephone line at the subscriber station to modulate a ringing signal over the line when both switches are closed without interfering with the ringing signal when either switch is open, said sensor switch located at the subscriber station and including means for closing the sensor switch when said abnormal condition is present at the subscriber station and for opening the sensor switch when the abnormal condition is not present at the subscriber station, said normally open control switch including means for closing the control switch at least intermittently in response to a ringing signal provided at said subscriber station in response to a call from said outside station, whereby both switches are closed at least intermittently when the abnormal condition is present at the subscriber station and the subscriber station is provided with a ringing signal in response to a call from the outside station, and said ringing signal is thereby modulated to indicate to the outside calling station that the abnormal condition is present.

11. A system for indicating an abnormal condition at premises provided with a telephone subscriber station callable from an outside telephone station to establish a ringing connection therewith over a telephone line, in which connection the subscriber station receives a ringing signal and the outside station receives a ring back signal, comprising:

sensor switch means having a first and a second state, said means located at the premises and responsive to the presence of said abnormal condition at the premises to be in its first state when said abnormal condition is present at the premises and to be in its second state at other times;

control switch means having a first and a second state and being normally in its first state but responsive to a ringing signal provided at the subscriber station in response to a call from the outside station to change to said second state and to maintain said second state at least intermittently for the duration of said ringing signal;

means for connecting the sensor switch means and the control switch means to each other and to the telephone line for modulating the ring back signal provided at the outside station only when the sensor switch means is in a selected one of its first and second states and the control switch means is in its second state.

12. A system as in claim 11, wherein said modulating of the ring back signal is an intermittent interruption of said ring back signal.

13. A system as in claim 11, wherein said modulating of the ring back signal simulates completion of the call from the outside station to the subscriber station.

14. A system as in claim 11, wherein the subscriber station includes a hammer operated ringer and wherein the control switch means includes means operable by said hammer, when the hammer is vibrating in response to a ringing signal, to change the control switch means to said second state and to maintain said second state at least intermittently.

15. A system as in claim 14, wherein the second state of the control switch means is maintained intermittently for the duration of said ringing signal.

16. A system as in claim 14, wherein the second state of the control switch means is maintained for a duration sufficient to complete the call from the outside station to the subscriber station.

17. A system as in claim 11, wherein the sensor switch means and the control switch means are in a series connection across the telephone line.

18. A system as in claim 17, wherein the sensor switch means is a closed circuit when in its first state in response to an abnormal condition, and wherein the control switch means is a closed circuit when in its second state.

19. A system as in claim 18, wherein the sensor switch means and the control switch means intermittently short the telephone line when the sensor switch means is in its first state and the control switch means is intermittently in its second state.

20. A system as in claim 18, wherein the sensor switch means and the control switch means short the telephone line to thereby complete the call from the outside station to the subscriber station when the sensor switch means is in its first state and the control switch means is in its second state.

* * * * *

UNITED STATES PATENT OFFICE
CERTIFICATE OF CORRECTION

Patent No. 3,809,813 Dated May 7, 1974

Inventor(s) Preston R. Brown

It is certified that error appears in the above-identified patent and that said Letters Patent are hereby corrected as shown below:

Title page: after [62]: "Division" should read -- Continuation --;

last line, in right-hand column: "2 Drawing Figures" should read -- 1 Drawing Figure --.

Second sheet of drawing should be deleted.

Col. 2, line 46: "with with" should be deleted;

line 60: "of" should read -- or --.

Col. 3, line 24: -- sufficiently -- should be inserted after "if";

line 25: -- of -- should be inserted after "warning".

Col. 4, line 17: "sttion" should read -- station --;

line 47, "snesor" should read -- sensor --.

Col. 6, line 3: "modulated" should read -- modulation --.

Signed and sealed this 28th day of January 1975.

(SEAL)
Attest:

McCOY M. GIBSON JR.
Attesting Officer

C. MARSHALL DANN
Commissioner of Patents

ORM PO-1050 (10-69)

USCOMM-DC 60376-P69
U.S. GOVERNMENT PRINTING OFFICE : 1969 O—366-334